Nov. 10, 1953 J. BELPEDIO Re. 23,731
CROWN CAP REMOVING AND RETAINING IMPLEMENT
Original Filed Aug. 22, 1950
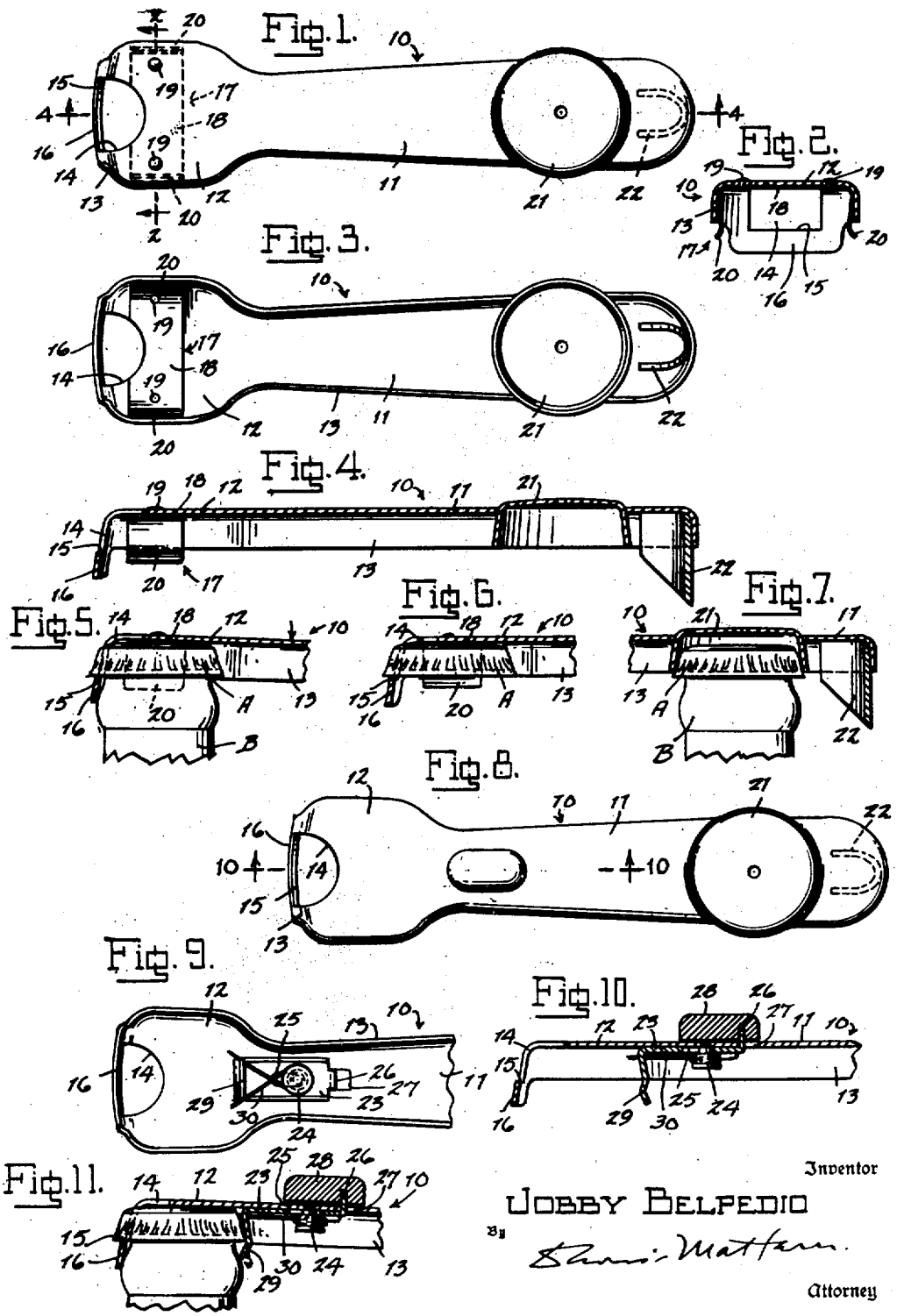
Inventor
JOBBY BELPEDIO
By
Attorney Reissued Nov. 10, 1953 Re. 23,731

UNITED STATES PATENT OFFICE 23,731

CROWN CAP REMOVING AND RETAINING IMPLEMENT

Jobby Belpedio, Bridgeport, Conn.

Original No. 2,593,091, dated April 15, 1952, Serial No. 180,778, August 22, 1950. Application for reissue January 21, 1953, Serial No. 332,582

6 Claims. (Cl. 81—3.1)

Matter enclosed in heavy brackets [ ] appears in the original patent but forms no part of this reissue specification; matter printed in italics indicates the additions made by reissue.

The present invention relates to an implement for opening and closing crown cap bottles, and has for an object to provide a device of this character by means of which the cap may be easily removed by a force amplifying lever action, and having means for centering the cap within the device preparatory to removal of the cap so that excessive distortion of the cap is prevented, enabling it to be effectually re-used to seal the bottle. A further object is to provide a cap removing device having spring means for centering the cap during removal and which retains the cap after removal, thus avoiding the usual procedure of allowing the cap to drop to the floor when removed, the retained cap therefore remaining in a sanitary condition for reuse. In this connection it is proposed to provide an enclosed wall adapted to surround the cap during and after its removal, so that it is protected from accidental disengagement and may be replaced upon the bottle without contact of the hands therewith.

Another object is to provide a cap removing device which will function to replace the cap upon the bottle without removing it from the spring retaining means, this being the procedure when a partial sealing of the bottle for a short period is desired, and which operation is carried out without reshaping the rim of the crown cap. In the case of re-sealing for use after an extended period it is desirable that the rim be reshaped, and for this purpose it is proposed in the present invention to provide a re-sealing part which may be engaged with the cap to reshape its rim into sealing engagement with the bottle.

Another object is to provide a cap removing implement which can also be used for piercing a can top.

With the above and other objects in view embodiments of the invention are shown in the accompanying drawings, and these embodiments will be hereinafter more fully described with reference thereto, and the invention will be finally pointed out in the claims.

In the drawings:

Fig. 1 is a top plan view of the implement according to one embodiment of the invention;

Fig. 2 is a transverse sectional view, taken above the line 2—2 of Fig. 1;

Fig. 3 is a bottom plan view:

Fig. 4 is a longitudinal sectional view, taken along the line 4—4 of Fig. 1;

Fig. 5 is a fragmentary view partially in longitudinal section showing the implement engaged with a cap upon a bottle;

Fig. 6 is a similar view showing the cap removed from the bottle;

Fig. 7 is a similar view showing the re-sealing means of the implement engaged with a cap upon a bottle;

Fig. 8 is a top plan view of a modified embodiment of the invention;

Fig. 9 is a fragmentary bottom plan view;

Fig. 10 is a fragmentary longitudinal sectional view, taken along the line 10—10 of Fig. 8;

Fig. 11 is a similar view showing the implement engaged with a cap upon a bottle.

Similar reference characters indicate corresponding parts throughout the several figures of the drawings.

Referring to the drawings, and more particularly to Figs. 1 to 7 thereof, the implement for opening and closing crown cap bottles, according to the exemplary embodiment of the invention illustrated therein, comprises an elongated body member 10, preferably pressed from sheet metal, having a handle portion 11 and a head portion 12, the latter being relatively wide to engage over a crown cap. A depending flange 13 extends around the peripheral edge of the handle and head portions, and serves to stiffen the implement and provide a rounded upper surface free from sharp edges, as well as to position and enclose the cap during and after removal.

The head portion is provided with a hole 14 at its forward edge extended downwardly into the forward portion of the flange 13, where it is provided with a horizontal edge 15 for engagement beneath the rim of the crown cap A of the bottle B, as shown in Fig. 5. The forward portion of the flange 13 is slightly curved outwardly, and is provided with a downwardly extending lip 16 for engaging the forward side of the bottle below the cap to thus determine, in cooperation with the side flange portion of the head, the proper centralized position of the cap within the head, the curvature of the edge 15 being such that it engages the lower edge of the cap at relatively widely spaced points, approximately 70° apart. Thus in removing the cap the under side of the head portion engages the top of the cap near its edge and directly over the circular top of the bottle, the point of engagement being along a diametric line centrally of the two points of engagement of the edge 15 with the cap. By pressing downward upon the outer end of the handle portion the cap is removed with little effort and a minimum amount of distortion.

At the inner side of the head portion 12 there is provided a leaf spring member 17 secured at its transverse portion 18 by rivets 19 and having downwardly extending end portions 20—20 disposed at the inner sides of the flange 13 where they normally incline inwardly, their lower end portions extending below the lower edge of the flange where they are slightly flared outwardly. This spring is positioned in the head portion so that it will extend diametrically across the crown cap when the lip 16 is in engagement with the forward side of the bottle, as shown in Fig. 5. The spring ends thus snap over the sides of the rim and retain the implement in centralized engagement with the cap preparatory to removal of the cap. Upon removal of the cap it will be retained by the spring ends within the implement in position to be replaced on the bottle simply by pressing with the palm of the hand upon the head portion of the implement, which is thereupon removed by lifting up on the handle, the lip 16 acting as a fulcrum to effect release of the spring ends from the cap. When the cap is not to be replaced on the bottle it can be readily removed from the implement by pressing with the finger through the hole 14 to release it from the spring ends.

For the purpose of re-forming the rim of the cap a re-sealing part 21 is provided in the handle portion near its rearward end. This part is of inverted cup-shape, its circular rim being slightly inclined upwardly and inwardly so that when pressed upon the cap, as shown in Fig. 7, it will force the rim of the cap inwardly into sealed relation upon the bottle. In carrying out this operation the cap is replaced upon the bottle by first pressing it into place with the head end, the part 21 being then placed over the head and hit firmly with the palm of the hand.

At the end of the handle rearwardly of the portion 21 a downwardly projecting sharpened prong member 22 of U-shape in cross-section is secured within the flange 13, preferably by brazing. This prong member is adapted for piercing a can top, the handle being engaged with the rim of the can at one side with the prong engaged with the can top adjacent the rim at the other side. By pressing downwardly on the member portion 21 the prong is caused to pierce the can top through the lever action of the handle.

In Figs. 8 to 11 there is shown a modified embodiment of the invention in which a spring catch means is employed in place of the leaf spring 17. This comprises a sheet metal catch member 23 at the under side of the handle portion slideably engaged for longitudinal movement upon a shouldered stud 24 riveted to the handle portion and engaged in a slot 25 of the catch member. An upwardly projecting lug 26 at the rearward end of the catch member is engaged in a slot 27 in the handle portion and has a knob 28 secured thereon at the upper side of the handle portion. A finger 29 is provided at the forward end of the catch member for retaining engagement with the rim of the crown cap, the catch member being normally urged forwardly by a hair-pin spring 30 engaged about the stud 24 with its ends pressing forwardly upon the side edges of the finger 29.

The operation of engaging the implement with the cap and removing the cap is substantially the same as in the embodiment of the invention illustrated in Figs. 1 to 7. To disengage the removed cap from the implement the catch is simply retracted by pressing the knob 28 rearwardly.

I have illustrated and described preferred and satisfactory embodiments of the invention, but it will be understood that changes may be made therein within the spirit and scope thereof, as defined in the appended claims.

What is claimed is:

1. [An] *A cap removing and retaining* implement for [opening and closing] crown cap bottles, comprising *a rigid body including* a substantially flat *horizontally disposed* forward head portion *adapted to be superimposed on a crown cap*, a *rigid* handle portion extending rearwardly from said head portion, a depending *rigid* flange having a forward portion at the forward end of said head portion and side portions extending along each of its sides adapted to *laterally* enclose the rim of a crown cap at each side, said forward portion having an opening for receiving the rim of a crown cap with the under side of said head portion engaging the upper side of said cap, said opening having a lower edge adapted to engage the under side of said cap rim, and yieldably movable means *laterally inwardly of said flange side portions* engageable with said cap rim at a point removed from its point of engagement in said opening to releasably retain it within the space defined by said head and flange portions upon removal from a bottle.

2. [An] *A cap removing and retaining* implement for [opening and closing] crown cap bottles, comprising *a rigid body including* a substantially flat *horizontally disposed* forward head portion *adapted to be superimposed on a crown cap*, a *rigid* handle portion extending rearwardly from said head portion, a depending *rigid* flange having a forward portion at the forward end of said head portion and side portions extending along each of its sides adapted to *laterally* enclose the rim of a crown cap at each side, said forward portion having an opening for receiving the rim of a crown cap with the under side of said head portion engaging the upper side of said cap, said opening having a lower edge adapted to engage the under side of said cap rim, and yieldably movable means *laterally inwardly of said flange side portions* engageable with said cap rim at a point removed from its point of engagement in said opening to releasable retain it within the space defined by said head and flange portions upon removal from a bottle, said opening extending rearwardly into said head portion to permit insertion of a finger to release said cap.

3. [An] *A cap removing and retaining* implement for [opening and closing] crown cap bottles, comprising *a rigid body including* a substantially flat *horizontally disposed* forward head portion *adapted to be superimposed on a crown cap*, a *rigid* handle portion extending rearwardly from said head portion, a depending *rigid* flange having a forward portion at the forward end of said head portion and side portions extending along each of its sides adapted to *laterally* enclose the rim of a crown cap at each side, said forward portion having an opening for receiving the rim of a crown cap with the under side of said head portion engaging the upper side of said cap, said opening having a lower edge adapted to engage the under side of said cap rim, and depending leaf spring means at transversely opposite sides of said head portion *laterally inwardly of said flange side portions* engageable with said cap rim at diametrically opposite points to releasably retain it within the space defined by said head and flange portions upon removal from a bottle.

4. [An] *A cap removing and retaining* implement for [opening and closing] crown cap bottles, comprising *a rigid body including* a substantially flat *horizontally disposed* forward head portion *adapted to be superimposed on a crown cap,* a *rigid* handle portion extending rearwardly from said head portion, a depending *rigid* flange having a forward portion at the forward end of said head portion and side portions extending along each of its sides adapted to *laterally* enclose the rim of a crown cap at each side, said forward portion having an opening for receiving the rim of a crown cap with the under side of said head portion engaging the upper side of said cap, said opening having a lower edge adapted to engage the under side of said cap rim, and a spring pressed catch at the under side of said head diametrically opposite said opening *and laterally inwardly of said flange side portions* engageable with said cap rim to cooperate with said forward portion to releasably retain said cap within the space defined by said head and flange portions upon removal from a bottle.

*5. A cap removing and retaining implement for crown cap bottles, comprising a rigid body including a substantially flat horizontally disposed forward head portion adapted to be superimposed on a crown cap, a rigid handle portion exending rearwardly from said head portion, a depending rigid flange having a forward portion at the forward end of said head portion and side portions extending along each of its sides adapted to laterally enclose the rim of a crown cap at each side, said forward portion having an opening for receiving the rim of a crown cap with the underside of said head portion engaging the upper side of said cap, said opening having a lower edge adapted to engage the under side of said cap rim, and means laterally inwardly of said flange side portions cooperable with said cap to releasably retain it within the space defined by said head and flange portions upon removal from a bottle.*

*6. A cap removing and retaining implement for crown cap bottles, comprising a rigid body including a substantially flat horizontally disposed forward head portion adapted to be superimposed on a crown cap, a rigid handle portion extending rearwardly from said head portion, a depending rigid flange having a forward portion at the forward end of said head portion and side portions extending along each of its sides adapted to laterally enclose the rim of a crown cap at each side, said forward portion having an opening for receiving the rim of a crown cap with the underside of said head portion engaging the upper side of said cap, said opening having a lower edge adapted to engage the under side of said cap rim, and means laterally inwardly of said flange side portions cooperable with said cap to releasably retain it within the space defined by said head and flange portions upon removal from a bottle, said opening extending rearwardly into said head portion to permit insertion of a finger to release said cap.*

JOBBY BELPEDIO.

References Cited in the file of this patent or the original patent

UNITED STATES PATENTS

| Number | Name | Date |
|---|---|---|
| 1,214,802 | Low | Feb. 6, 1917 |
| 1,867,571 | Jelinek | July 19, 1932 |
| 1,944,310 | Wagner | Jan. 23, 1934 |
| 2,080,947 | Ligeour | May 18, 1937 |
| 2,155,947 | Low | Apr. 25, 1939 |

FOREIGN PATENTS

| Number | Country | Date |
|---|---|---|
| 183,821 | Great Britain | Mar. 8, 1923 |
| 393,872 | Great Britain | June 15, 1933 |